US009513840B2

United States Patent
Brown et al.

(10) Patent No.: US 9,513,840 B2
(45) Date of Patent: Dec. 6, 2016

(54) PARALLEL PROCESSES FOR PERFORMING MULTIPLE INCREMENTAL COPIES

(71) Applicant: International Business Machines Corporation, Armonk, NY (US)

(72) Inventors: Theresa M. Brown, Tucson, AZ (US); Nedlaya Y. Francisco, Tucson, AZ (US); Suguang Li, Tucson, AZ (US); Mark L. Lipets, Tucson, AZ (US); Carol S. Mellgren, Tucson, AZ (US); Raul E. Saba, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/172,761

(22) Filed: Jun. 3, 2016

(65) Prior Publication Data

US 2016/0283128 A1   Sep. 29, 2016

Related U.S. Application Data

(63) Continuation of application No. 13/900,381, filed on May 22, 2013, now Pat. No. 9,389,799.

(51) Int. Cl.
*G06F 3/06* (2006.01)
*G06F 11/14* (2006.01)

(52) U.S. Cl.
CPC ............. *G06F 3/065* (2013.01); *G06F 3/0619* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 6,611,901 B1 | 8/2003 | Micka et al. |
| 6,996,586 B2 | 2/2006 | Stanley et al. |
| 7,000,145 B2 | 2/2006 | Werner et al. |
| 7,024,530 B2 | 4/2006 | Jarvis et al. |
| 2005/0071710 A1 | 3/2005 | Micka et al. |
| 2010/0077142 A1 | 3/2010 | Fienblit et al. |
| 2012/0089795 A1 | 4/2012 | Benhase et al. |
| 2014/0351533 A1 | 11/2014 | Brown et al. |

OTHER PUBLICATIONS

C. Burger, et al., "IBM System Storage DS8000 Series: IBM FlashCopy SE", IBM Corporation, RedPaper, Feb. 2008, Document REDP-4368-00, pp. 80.
Preliminary Amendment dated May 23, 2013, pp. 16 for U.S. Appl. No. 13/900,381, May 22, 2013.
Office Action dated Apr. 6, 2014, pp. 16, for U.S. Appl. No. 13/900,381, filed May 22, 2013.
Response dated Jun. 30, 2015, pp. 11, to Office Action dated Apr. 6, 2015, pp. 16, for U.S. Appl. No. 13/900,381, filed May 22, 2013.
Final Office Action dated Sep. 24, 2015, pp. 11, for U.S. Appl. No. 13/900,381, filed May 22, 2013.
Response dated Dec. 22, 2015, pp. 11, to Final Office Action dated Sep. 24, 2015, pp. 11, for U.S. Appl. No. 13/900,381, filed May 22, 2013.
Notice of Allowance dated Apr. 8, 2016, pp. 9, for U.S. Appl. No. 13/900,381, filed May 22, 2013.

*Primary Examiner* — Prasith Thammavong
*Assistant Examiner* — Jason Blust
(74) *Attorney, Agent, or Firm* — Rabindranath Dutta; Konrad Raynes Davda & Victor LLP

(57) ABSTRACT

A storage controller receives a write command with respect to a track, from a host. A first process determines that the track is a source track and also determines that at least one corresponding target track is in an incremental copy relation to the source track. A second process is generated to modify a target change recording structure, where the second process executes in parallel with the first process.

15 Claims, 12 Drawing Sheets

PARALLEL PROCESSES FOR PERFORMING MULTIPLE INCREMENTAL COPIES

CROSS-REFERENCE TO RELATED APPLICATIONS

This application is a continuation of U.S. patent application Ser. No. 13/900,381, filed May 22, 2013, wherein U.S. patent application Ser. No. 13/900,381 is incorporated herein by reference in its entirety.

BACKGROUND

1. Field

Embodiments relate to parallel processes for performing multiple incremental copies.

2. Background

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives connected in a loop architecture, otherwise referred to as a Direct Access Storage Device (DASD), and other storage devices. Hosts may communicate Input/Output (I/O) requests to the storage space through the storage controller.

In many systems, data on one storage device, such as a DASD, may be copied to the same or another storage device so that access to data volumes can be provided from two different devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

A number of direct access storage device (DASD) subsystems are capable of performing "instant virtual copy" operations, also referred to as "fast replicate functions." Instant virtual copy operations work by modifying metadata such as relationship tables or pointers to treat a source data object as both the original and copy. In response to a copy request from a host, the storage subsystem substantially immediately reports creation of the copy without having made any physical copy of the data. Only a "virtual" copy is created, and the absence of an additional physical copy is completely unknown to the host.

Later, when the storage system receives updates to the original or copy, the updates are stored separately and cross-referenced to the updated data object. At this point, the original and copy data objects may begin to diverge. The initial benefit is that the instant virtual copy occurs almost instantaneously, completing much faster than a normal physical copy operation. This frees the host and storage subsystem to perform other tasks. The host or storage subsystem may proceed to create an actual, physical copy of the original data object during background processing, or at another time.

One such instant virtual copy operation is known as a FLASHCOPY® operation. (FLASHCOPY is a registered trademark or common law mark of International Business Machines Corporation in the United States and/or other countries.) A FLASHCOPY® operation involves establishing a logical point-in-time relationship between source and target volumes on the same or different devices. The FLASHCOPY® operation guarantees that until a track in a FLASHCOPY® relationship has been hardened to its location on the target disk, the track resides on the source disk. A relationship table is used to maintain information on all existing FLASHCOPY® relationships in the subsystem. During the establish phase of a FLASHCOPY® relationship, one entry is recorded in the source and target relationship tables for the source and target that participate in the FLASHCOPY® being established. Each added entry maintains all the required information concerning the FLASHCOPY® relationship. Both entries for the relationship are removed from the relationship tables when all FLASHCOPY® tracks from the source extent have been physically copied to the target extents or when a withdraw command is received. In certain cases, even though all tracks have been copied from the source extent to the target extent, the relationship persists.

A target bitmap identifies which tracks involved in the FLASHCOPY® relationship have not yet been copied over and are thus protected tracks. Each track in the target device is represented by one bit in the bitmap. The target bit is set when the corresponding track is established as a target track of a FLASHCOPY® relationship. The target bit is reset when the corresponding track has been copied from the source location and destaged to the target device due to writes on the source or the target device, or a background copy task.

In certain mechanisms, as part of the establishment of the logical point-in-time relationship during the FLASHCOPY® operation, all tracks in the source cache that are included in the FLASHCOPY® relationship are destaged to the physical source volume, e.g., source DASD, and all tracks in the target cache not included in the FLASHCOPY® must be discarded.

Once the logical relationship is established, hosts may then have immediate access to data on the source and target volumes, and the data may be copied as part of a background operation. A read to a track that is a target in a FLASHCOPY® relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the FLASHCOPY® operation. Further, any destages to tracks on the source device that have not been copied over triggers a destage intercept, which causes the tracks on the source device to be copied to the target device.

Instant virtual copy techniques have been developed, at least in part, to quickly create a duplicate copy of data without interrupting or slowing foreground processes. Instant virtual copy techniques, such as a FLASHCOPY® operation, provide a point-in-time copy tool. Instant virtual copy techniques may be used for a variety of applications, including, for example, data backup, data migration, data mining, testing, etc. For example, an instant virtual copy technique may be used for the creation of a physical "backup" copy of the source data, to aid in disaster recovery.

Thus, an instant virtual copy may be described as an instant snapshot of a data set or volume. There is a source volume and a target volume. The target volume is an instant snapshot of the source volume. Any changes to the source volume after the instant virtual copy has been established are not copied to the target.

An incremental virtual copy (e.g., an incremental FLASHCOPY®) is an enhancement of an instant virtual copy. The incremental virtual copy creates multiple snapshots over a period of time using the same source volume and target volume. It should be noted that incremental copy may include not only virtual copies but may also include physical copies if background copy is selected, i.e., an incremental copy may include both an incremental virtual copy and/or an incremental physical copy.

In an incremental copy, the first flash of a source volume to a target volume is usually done with background copy. When the background copy finishes, data has been copied from the source volume to the target volume. After the first incremental copy is established, there may be subsequent flashes or increments between the same source volume and target volume. Subsequent flashes or increments copy modified tracks from the source volume to the target volume since the last flash or increment.

The incremental copy has two additional bitmaps: 1) a Change Recording (CR) bitmap on the source volume and 2) a Change Recording (CR) bitmap on the target volume. The source CR bitmap has a bit for every track on the source volume. When there is a write on a track of the source volume after the incremental copy has been established, then a bit is set in the source CR bitmap to indicate that the track needs to be copied in the subsequent flash or increment. If there is a write on the target volume after the establish, then a bit is set in the target CR bitmap to indicate that the track needs to be copied in the subsequent flash or increment. On a subsequent flash or increment, the source and target CR bitmaps are merged into the target bitmap to indicate the tracks that need to be copied from the source volume.

In certain mechanisms, the incremental copy has a CR bitmap on a source volume for every incremental copy. So, if there are N incremental copy targets, then N source CR bitmaps are kept on the source volume.

Incremental copy provides the capability to refresh a volume in a FLASHCOPY® relationship and reduce background copy time when only a subset of data has changed. The main idea of incremental copy is maintaining a CR bitmap for every incremental relationship. Any writes to customer tracks on a source or a target volume will be remembered by the CR bitmap. This bitmap may be used later to indicate which tracks need to be recopy from source to target at next refresh.

In certain mechanisms, the function of incremental copy maintains a change recording bitmap on both source and target volume and support only one incremental copy relationship for a volume. In order to support more than one incremental relationship, a volume may require multiple change recording bitmaps. Increasing the number change recording bitmaps on a volume has several disadvantages: (a) Such a design does not scale well when many incremental relationships are required; (b) Change recording bitmaps cannot be attained dynamically and may have to be reserved in metadata and may require code changes; (c) Reserving change recording bitmaps wastes metadata space if a customer does not use incremental copy. Only source volumes may use more than one CR bitmap. That means that more than one change recording bitmap on a target volume is unnecessary; (d) Maintaining and managing multiple change recording bitmaps on the same volume increases the complexity of code.

An alternative approach in which instead maintaining the change recording bitmap on both source and target volumes, a change recording bitmap is maintained on target volume only. Any writes to customer tracks on both source and target volumes may be remembered by the change recording bitmap on the target volume.

If a source volume has multiple incremental targets, writes to source tracks may be remembered by all change recording bitmaps on those incremental target volumes. This approach allows users to avoid the complicated maintenance of multiple change recording bitmaps on the same volume. Since any incremental target volume can be in only one relationship, only one change recording bitmap is needed on incremental target volume.

Therefore, these mechanisms avoid having a change recording structure on the source storage. In such mechanisms in which there is a change recording structure at a target only, the source directly updates the target change recording structure, and the target change recording structure controls the copying from the source to the target. Such mechanisms have one target change recording structure for an incremental copy on the copy target.

SUMMARY OF THE PREFERRED EMBODIMENTS

Provided are a method, a system, and a computer program in which a processor receives a write command with respect to a track, from a host. A first process determines that the track is a source track and also determines that at least one corresponding target track is in an incremental copy relation to the source track. A second process is generated to modify a target change recording structure, wherein the second process executes in parallel with the first process.

In certain embodiments, the first process is a track access intercept process, and the second process is a set change recording bit process.

In further embodiments, in a first type of incremental copy relation, change recording structures are maintained on a source volume and on a single target volume. In a second type of incremental copy relation no change recording structures are maintained on the source volume and the change recording structures are maintained on one or more target volumes, where in presence of both the first type of incremental copy relation and the second type of incremental copy relation, the change recording structures are set on the one or more target volumes and the source volume during a track access intercept process that comprises the first process.

In additional embodiments, the first process determines that the track is a target track. The target change recording structure is modified, in response to determining that the track is a target track.

In yet additional embodiments, a source volume is in an incremental copy relation with a plurality of target volumes, and a plurality of second processes are generated to modify target change recording structures corresponding to the plurality of target volumes, wherein the plurality of second processes execute in parallel with the first process.

In further embodiments, the second process initiates additional processes for a local group and a cross-cluster group, wherein the additional processes return control to the second process subsequent to initiation and completion of change recording processes.

In certain embodiments, the incremental copy relation is established to perform incremental copy operations comprising incremental point-in-time copy operations, wherein in the incremental copy operations after a first incremental copy is established, subsequent increments copy modified tracks from a source volume to a target volume since a last increment between the source volume and the target volume.

BRIEF DESCRIPTION OF THE DRAWINGS

Referring now to the drawings in which like reference numbers represent corresponding parts throughout.

DETAILED DESCRIPTION

Figure 1:
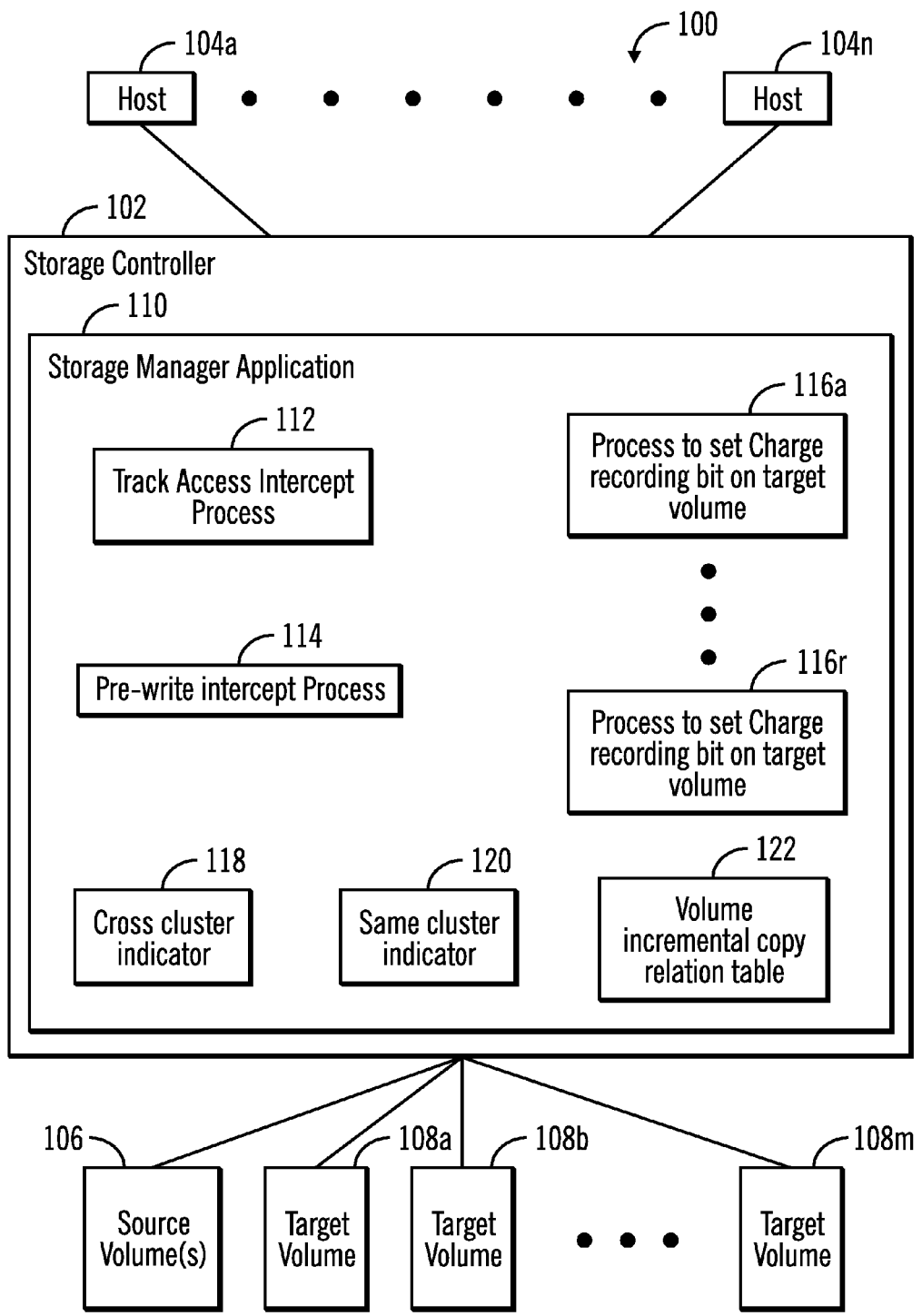
FIG. 1 illustrates a block diagram of a computing environment that includes a storage controller coupled to a plurality of hosts, in accordance with certain embodiments.

In the following description, reference is made to the accompanying drawings which form a part hereof and which illustrate several embodiments. It is understood that other embodiments may be utilized and structural and operational changes may be made.

In certain embodiments, source track changes are reflected on target change recording structures by sending change indications to one or more target volumes at source track writing time in parallel with other tasks required to prepare for source writes.

In order to let all target volumes remember the track changed on source, the source volumes have to first know which volumes are incremental targets, and then send the information of changed source track to them and set bits in the change recording bitmap. This is a time consuming task. Delaying the source writes in order to set change recording bits on targets may cause severe performance degradations.

In certain alternate mechanisms, methods were designed to limit the performance degradation of recording changes only on the target volume. One design does not allow cross cluster incremental relations because setting change recording bit on an opposite cluster is even more time consuming. Another design avoids setting change recording bit at source write time, but may set it at source track destaging time. The drawback of the last method is that refresh (increment) can not be completed until scan to destage all data in cache for this refresh on source volume completes. The next refresh (increment) may have to be delayed if this destage scan has not completed yet, therefore extending the establish time for the refresh. This delay is increased when the I/O (writes) to the source volume is heavy, requiring many destages.

Certain embodiments provide a mechanism to set change recording bit on targets for a source track which is being written without causing a significant impact on performance. Changes are recorded in the change recording bitmap on target while performing other tasks in parallel during source write "Track Access Intercept" processing. Since "Track Access Intercept" already needs to query incremental copy relation, the task to set change recording bit on target can directly use results of this query. The Track Access Intercept also has a lot of other work to do for source track write, e.g., check all targets relation status, check a target volume online status, allocate space for target extent if it has not allocated yet, destage modified data in cache for this source track if the data needs to be protected for one or more target relationships, trigger copy of source data (on device) to target if there is a need to destage data in cache, but the data on device belongs to other target relation, etc. This makes it possible to complete the task of setting change recording bit on targets without taking much extra time when it runs in parallel with original tasks that are needed to be completed by Track Access Intercept (In certain embodiments it may also be necessary to set change recording bitmap on the source at this time). Embodiments do not exclude cross cluster incremental relations and the completion of incremental relation refresh does not have to wait until destage scan completes, so there is no delay for the next refresh.

Exemplary Embodiments

FIG. 1 illustrates a block diagram of a computing environment 100 that includes a storage controller 102 coupled to a plurality of hosts 104a . . . 104n, in accordance with certain embodiments.

The storage controller 102 and the hosts 104a . . . 104n may comprise any suitable computational device including those presently known in the art, such as, a personal computer, a workstation, a server, a mainframe, a hand held computer, a palm top computer, a telephony device, a network appliance, a blade computer, a server, etc. The storage controller 102 may be coupled to storage devices (not shown) that may comprise any suitable storage device including those presently known in the art, such as magnetic disks, optical disks, tapes, etc. In certain embodiments, the host 104, the storage controller 102, and the storage devices may be coupled via a network, such as the Internet, an intranet, a storage area network, a local area network, etc.

The storage controller 102 controls a plurality of source volumes 106 and target volumes 108a, 108b, . . . , 108m, wherein the source volumes 106 and target volumes 108a . . . 108m are logical representations of physical storage maintained in storage devices coupled to the storage controller 102. Data stored in the source volumes 106 and target volumes 108a . . . 108m may be represented in tracks, extents, or some other unit of storage.

A storage manager application 110 executes in the storage controller 102. The storage manager application 110 may be implemented in software, hardware, firmware or any combination thereof. Associated and/or included in the storage manager application 110 is a track access intercept process 112, a pre-write intercept process 114, a plurality of processes 116a . . . 116r to set change recording bit on target volumes, a cross cluster indicator 118, a same cluster indicator 120, a volume incremental copy relation table 122, where these processes 112, 114, 116a . . . 116r and data structures 118, 120, 122 in combination with other processes and data structures stored or executed in the storage controller 102, allow the storage manager application 110 to generate incremental copies of source volumes 106 into target volumes 108a . . . 108m, and also allow source track changes to be reflected on target change recording structures by sending change indications to one or more target volumes at source track writing time in parallel with other tasks required to prepare for source writes.

Figure 2:
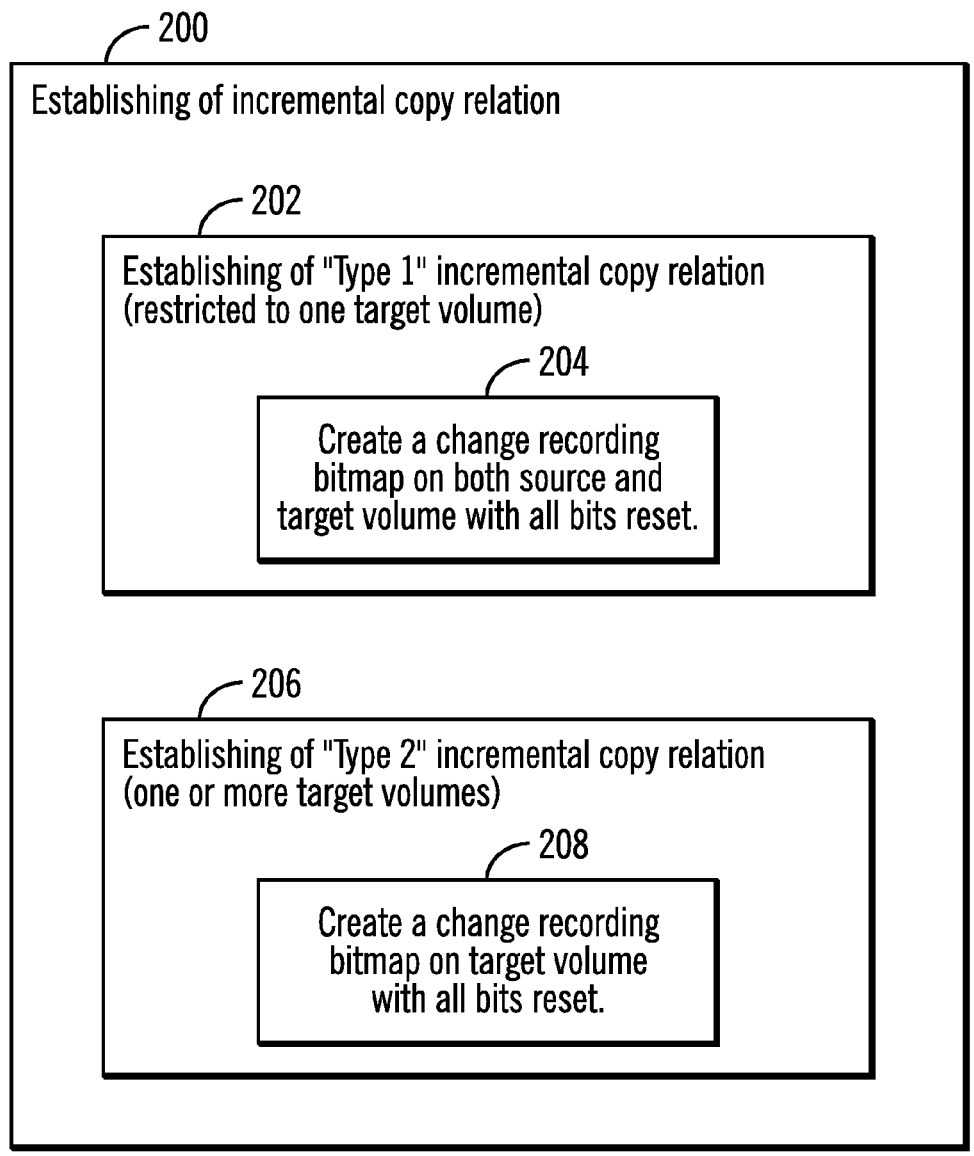
FIG. 2 illustrates a block diagram that shows how incremental copy relations are established, in accordance with certain embodiments.

FIG. 2 illustrates a block diagram 200 that shows how incremental copy relations are established, in accordance with certain embodiments.

A "Type 1" incremental copy relation 202 is established by creating a change recording bitmap on both source and a corresponding target volume with all bits reset (shown via reference numeral 204), wherein in certain embodiments a resetting of a bit means that the bit is 0, and setting of a bit means that the bit is 1.

A "Type 2" incremental copy relation 206 is established by creating a change recording bitmap on one or more target volumes with all bits reset (shown via reference numeral 208).

Figure 3:
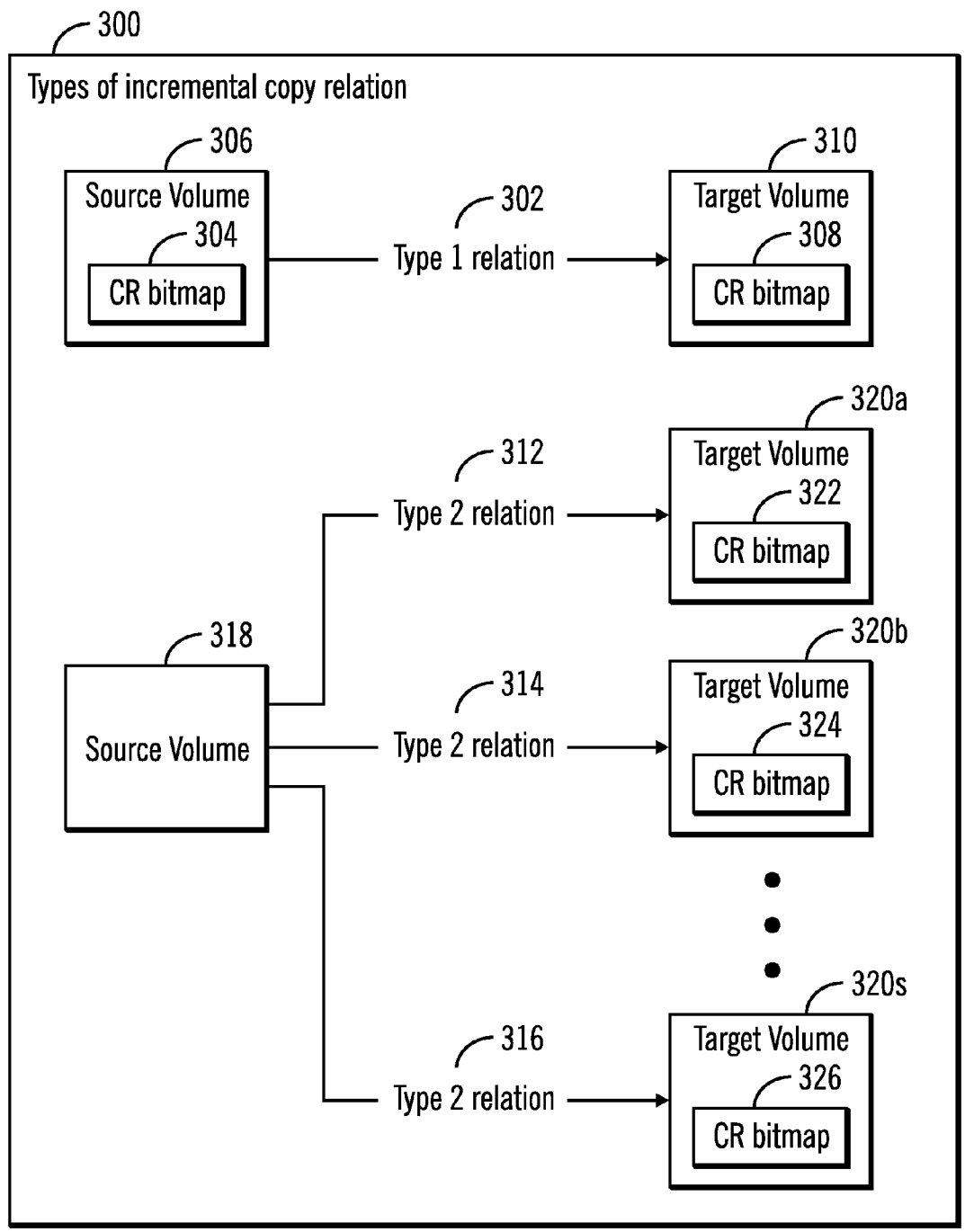
FIG. 3 illustrates a block diagram that shows the types of incremental copy relations, in accordance with certain embodiments.

FIG. 3 illustrates a block diagram 300 that shows the types of incremental copy relations 300, in accordance with certain embodiments. In a "Type 1" relation there is a change recording (CR) bitmap 304 on a source volume 306 and a CR bitmap 308 on the corresponding target volume 310. In a type 2 relation (shown via reference numerals 312, 314, 316) the source volume 318 is in a type 2 relation with the target volumes 320a, 320b, . . . 320s, where each of the target volumes 320a, 320b, 320s has a CR bitmap 322, 324, 326 but no CR bitmap is maintained in the source volume 318. It should be noted that incremental copy is performed between the source volume 318 and the target volumes 320a . . . 320s, and between the source volume 306 and the target volume 310.

Figure 4:
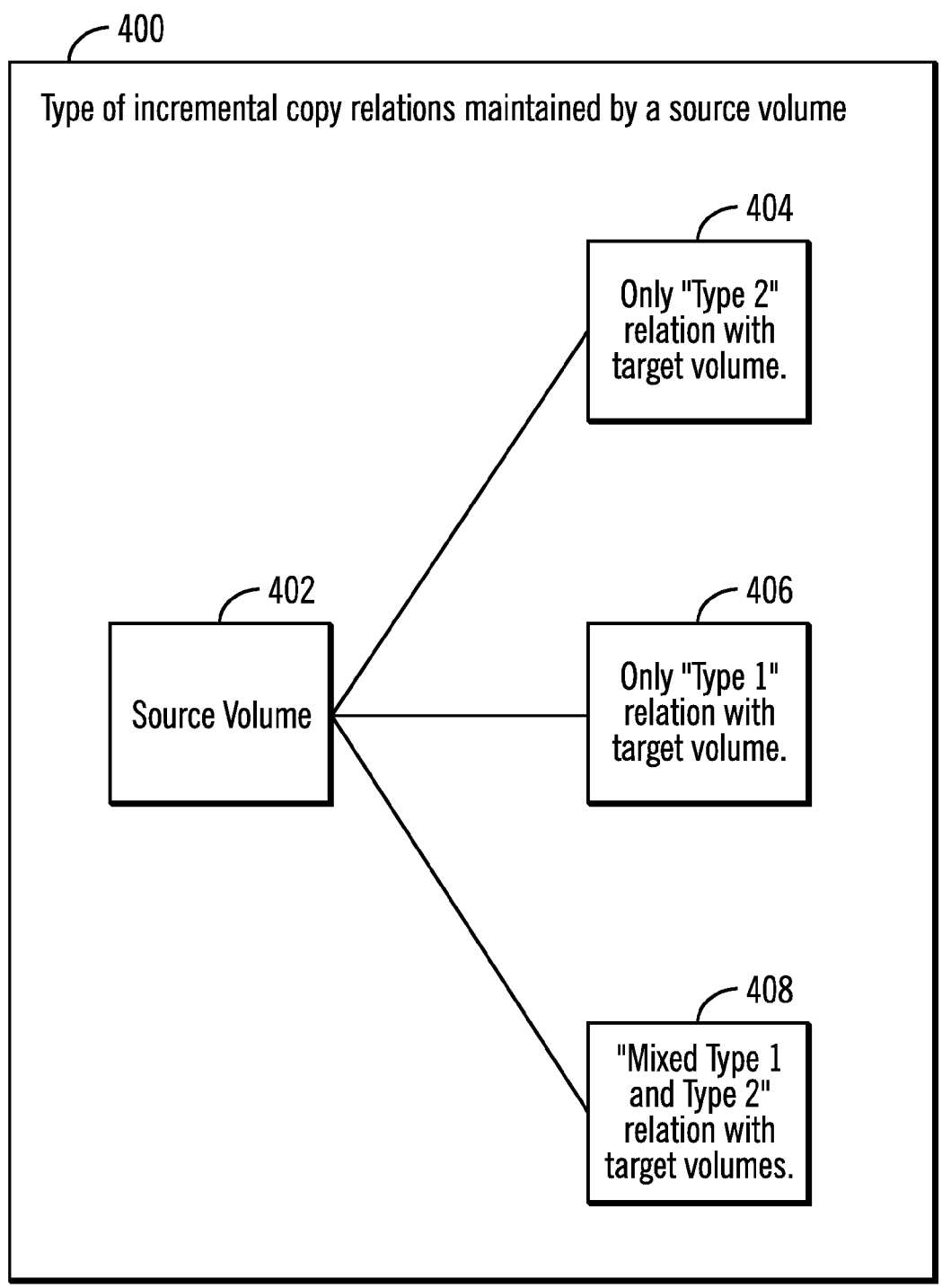
FIG. 4 illustrates a block diagram that shows types of incremental copy relations maintained by a source volume, in accordance with certain embodiments.

FIG. 4 illustrates a block diagram 400 that shows types of incremental copy relations maintained by a source volume, in accordance with certain embodiments. The exemplary source volume 402 may be only in a "Type 2" relation with one or more target volumes (reference numeral 404) or may be only in a "Type 1" relation to a target volume (reference numeral 406), or may be in a "Mixed Type 1 and Type 2" relation with target volumes (reference numeral 408).

Figure 5:
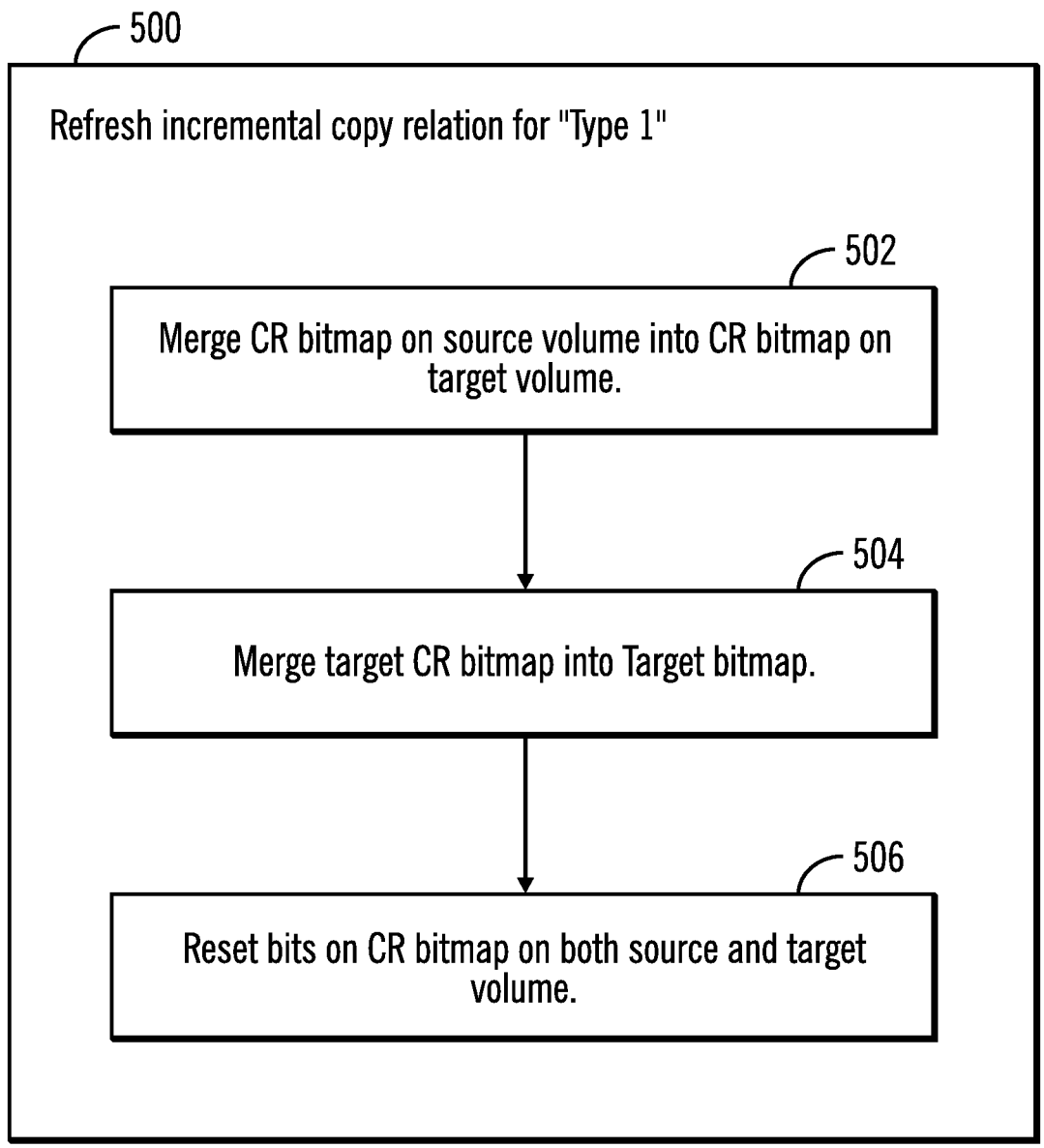
FIG. 5 illustrates a flowchart that shows refresh operations for "Type 1" incremental copy relations, in accordance with certain embodiments.

FIG. 5 illustrates a flowchart 500 that shows refresh operations for "Type 1" incremental copy relations, in accordance with certain embodiments. The operations shown in FIG. 5 may be performed by one or more components of the storage manager application 110 that executes in the storage controller 102.

Control starts at block 502 in which the changer recording (CR) bitmap on a source volume is merged into the CR bitmap in the target volume, and then control proceeds to block 504 in which the target CR bitmap is merged into the target bitmap. Subsequently, at block 506, bits on the CR bitmap are reset on both the source and target volumes.

Figure 6:
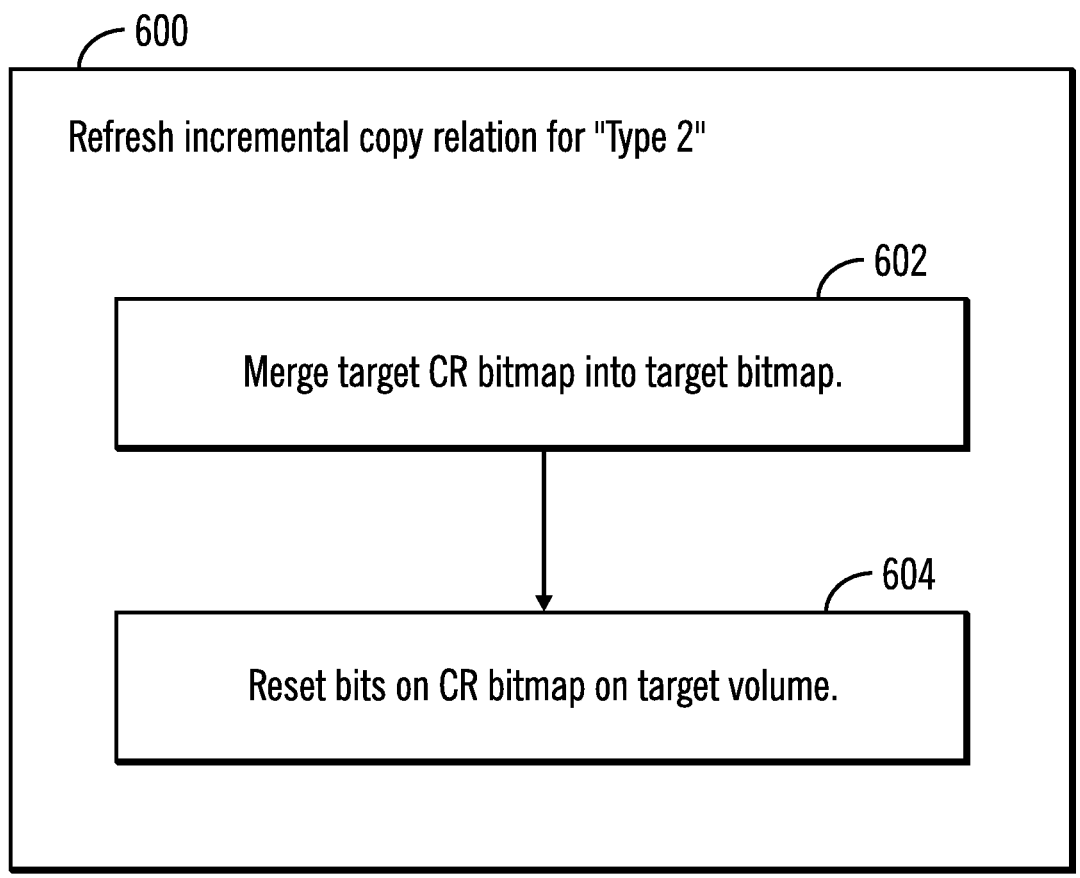
FIG. 6 illustrates a flowchart that shows refresh operations for "Type 2" incremental copy relations, in accordance with certain embodiments.

FIG. 6 illustrates a flowchart 600 that shows refresh operations for "Type 2" incremental copy relations, in accordance with certain embodiments. The operations shown in FIG. 6 may be performed by one or more components of the storage manager application 110 that executes in the storage controller 102.

Control starts at block 602 in which the target CR bitmap is merged into the target bitmap 602, and then bits are reset (block 604) on the CR bitmap in the target volume.

Figure 7:
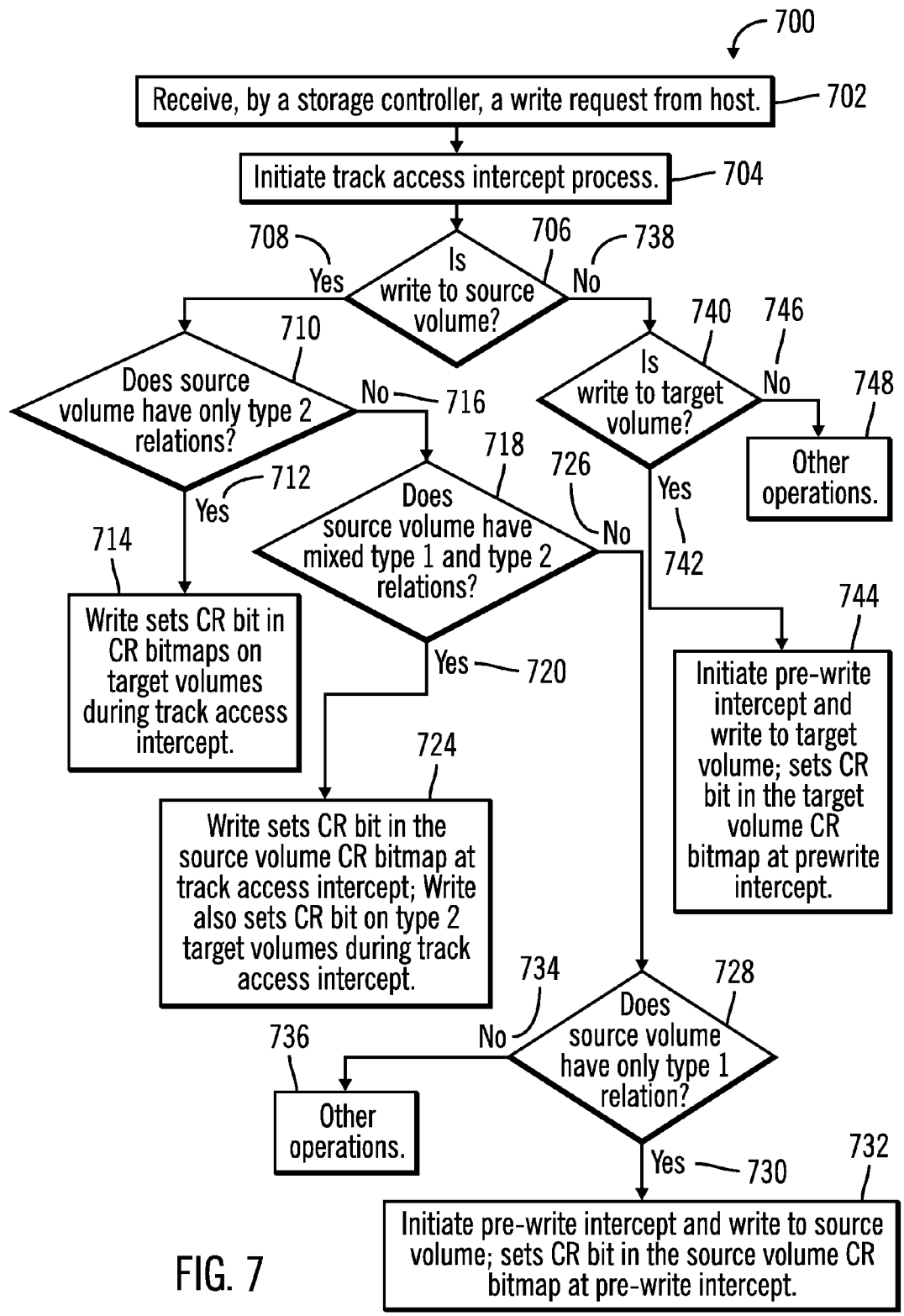
FIG. 7 illustrates a flowchart that shows first operations, in accordance with certain embodiments.

FIG. 7 illustrates a flowchart 700 that shows first operations, in accordance with certain embodiments. The operations shown in FIG. 7 may be performed by one or more components of the storage manager application 110 that executes in the storage controller 102.

Control starts at block 702 in which a write request is received by the storage controller 102 from a host 104a . . . 104n. The track access intercept process 112 is initiated (at block 704). Control proceeds to block 706 in which a determination is made as to whether the write is to a source volume. If so ("Yes" branch 708) control proceeds to block 710 in which a determination is made as to whether the source volume has only "Type 2" relations. If so ("Yes" branch 712), the write sets (at block 714) CR bit in CR bitmaps on target volumes during track access intercept.

At block 710, if it is determined that the source volume does not have only "Type 2" relations ("No" branch 716), a determination is made (at block 718) as to whether the source volume has "Mixed Type 1 and Type 2" relations. If so ("Yes" branch 720), write sets (at block 724) CR bit in the source volume CR bitmap at track access intercept. Write also sets CR bit on "Type 2" target volumes during track access intercept.

If at block 718, a determination is made that the source volume does not have "Mixed Type 1 and Type 2" relation ("No" branch 726) control proceeds to block 728, in which a determination is made as to whether the source volume has only "Type 1" relation. If so ("Yes" branch 730), then pre-write intercept is initiated and write is performed to source volume, and the write sets CR bit in the source volume CR bitmap at pre-write intercept (at block 732). If not ("No" branch" 734) other operations are performed (at block 736).

If at block 706, it is determined that the write is not to a source volume ("No" branch 738) control proceeds to block 740 in which a determination is made as to whether the write is to a target volume. If so ("Yes" branch 742), pre-write intercept is initiated and write is performed to target volume, and the write sets CR bit in the target volume CR bitmap at pre-write intercept (block 744). If not ("No" branch 746), other operations are performed (block 748).

Figure 8:
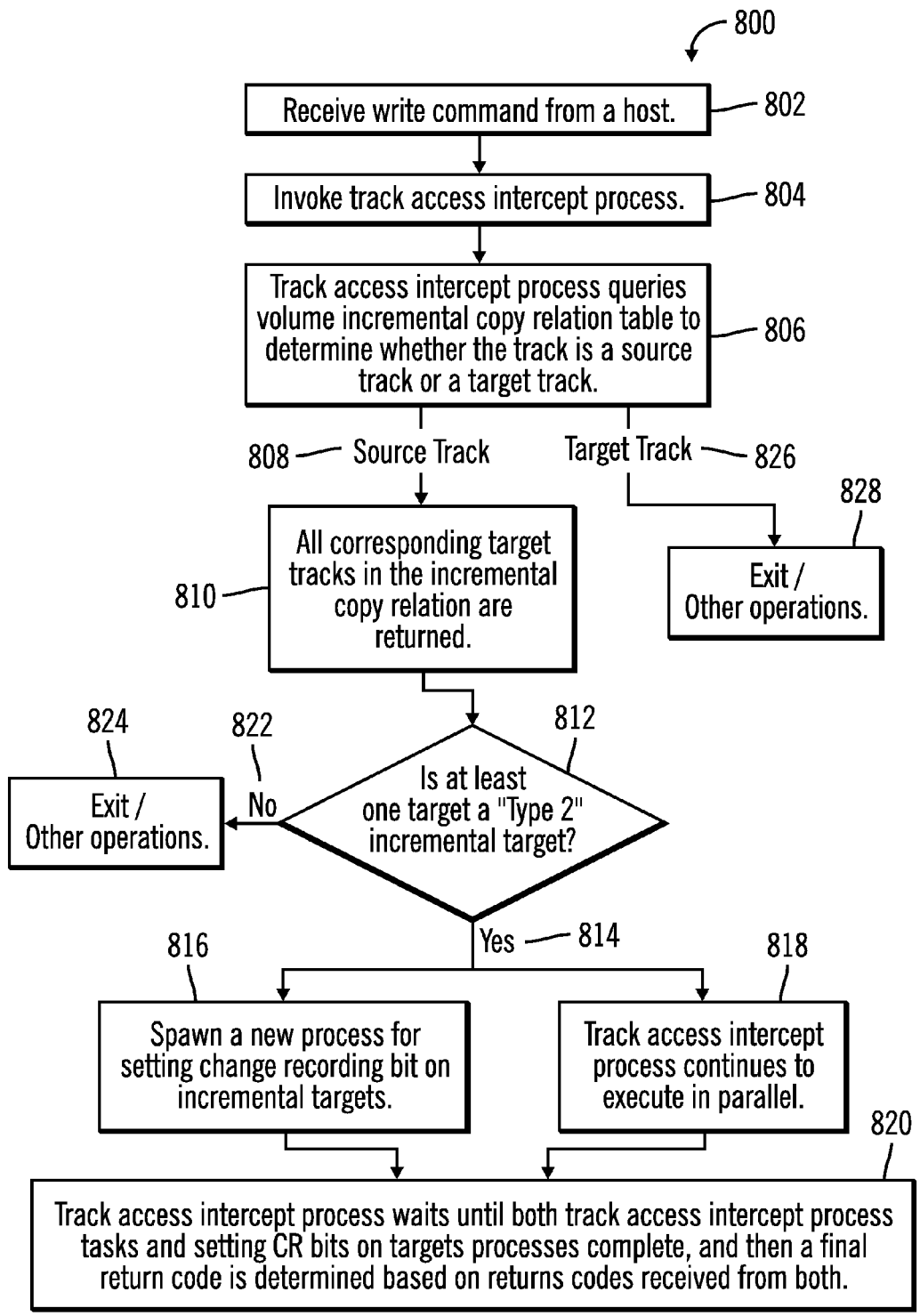
FIG. 8 illustrates a flowchart that second operations, in accordance with certain embodiments.

FIG. 8 illustrates a flowchart that shows second operations 800, in accordance with certain embodiments. The operations shown in FIG. 8 may be performed by one or more components of the storage manager application 110 that executes in the storage controller 102.

Control starts at block 802 in which the storage controller 102 receives a write command from a 104a . . . 104n. The storage manager application 110 invokes (at block 804) the track access intercept process 112. The track access intercept process queries (at block 806) the volume incremental copy relation table 122 to determine whether the track is a source track or a target track. If the track is a source track (branch 808) then all corresponding target tracks in the incremental copy relation are returned (at block 810).

Control proceeds to block 812 in which a determination is made as to whether at least one target is a "Type 2" incremental target. If so ("Yes" branch 814) then a new process 116a . . . 116r for setting change recording bit on incremental targets is spawned (at block 816), and in parallel (block 818) the track access intercept process 112 continues to execute. If there are multiple (e.g., tens, hundreds, or thousands, etc.) incremental targets then multiple new processes 116a . . . 116r are spawned for setting change recording bits on the multiple incremental targets, Form blocks 816 and 818 control proceeds to block 820 in which the track access intercept process 112 waits until both track access intercept process tasks and setting CR bits on target processes complete, and then a final return code is determined based on returns codes received from both.

From block 812, on a "No" branch 822 other operation are performed (at block 824). Also, if the track is a target track at block 806 (branch 826) then other operations are performed (at block 828).

Therefore, FIG. 8 illustrates certain embodiments in which CR bits on multiple targets are set in parallel with operations performed by the track access intercept process, as shown by block 816 and 818. As a result of the parallel processing, even if a large number of incremental targets exist, the system performance is not impaired.

Figure 9:
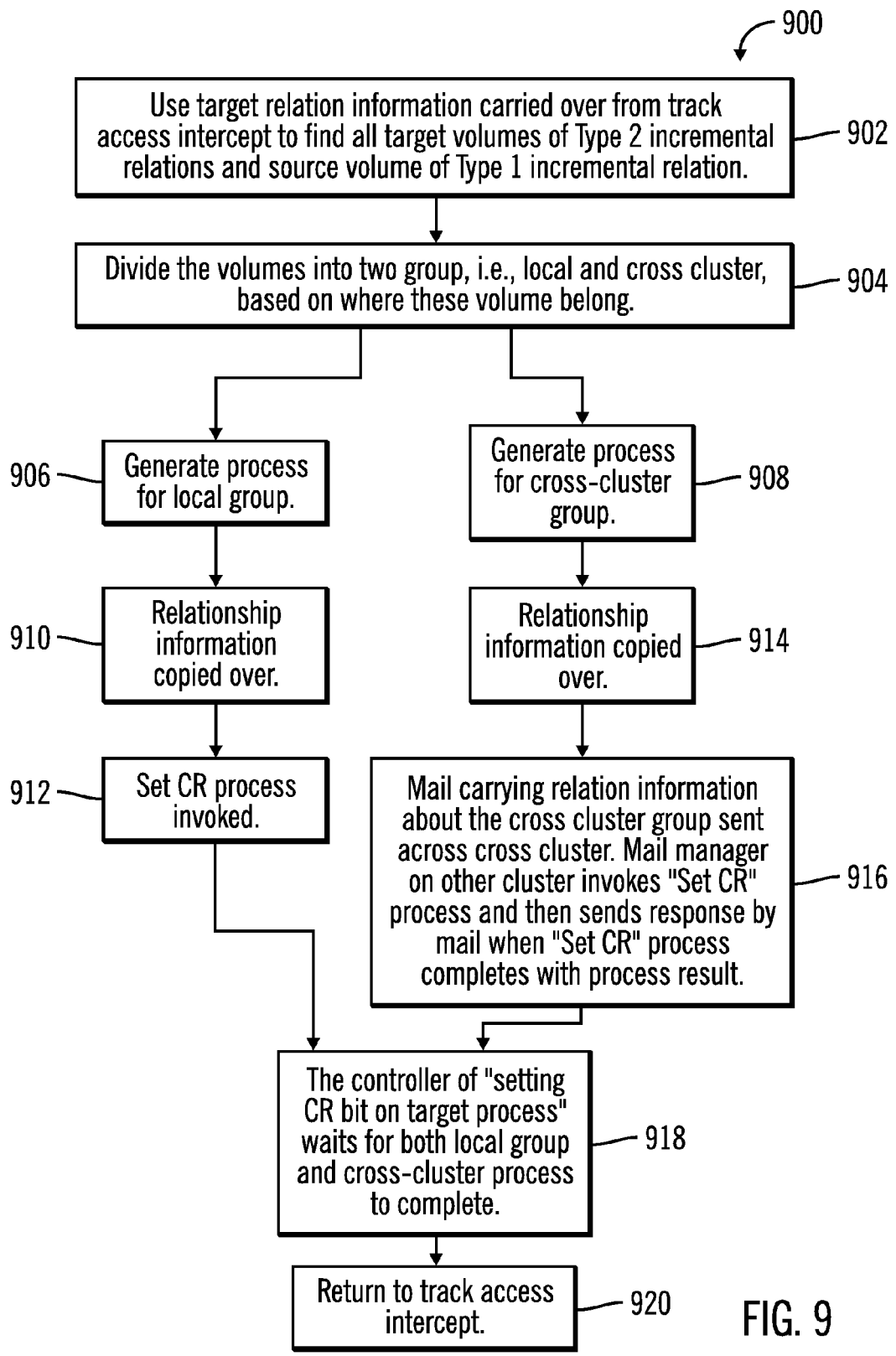
FIG. 9 illustrates a flowchart that shows third operations, in accordance with certain embodiments.

FIG. 9 illustrates a flowchart that shows third operations 900, in accordance with certain embodiments. The operations shown in FIG. 9 may be performed by one or more components of the storage manager application 110 that executes in the storage controller 102.

Control starts at block 902 in which the setting CR bit on targets process uses target relation information carried over from track access intercept to find all target volumes of "Type 2" incremental relations and source volume of "Type 1" incremental relation, and then these volumes are divided (at block 904) into two groups (local group and cross cluster group), based on where these volume belong. Two processes are generated for local and cross cluster group (block 906, 908) based on information included in the cross-cluster indicator 118 and the same cluster indicator 120.

Relationship Information belonging to the group are copied to its process (blocks 910, 914). If a cross cluster group exists, a mail carrying relation information about cross cluster group may be sent across cross cluster. Mail manager on the other cluster may invoke "Set CR" process and then send response mail back when "Set CR" process completes with process result (block 916). Local group directly invokes "Set CR" process (block 912). The controller of "setting CR bit on targets process" waits for both local and cross cluster process to complete (block 918) before returning back to the track access intercept process (at block 918).

Figure 10:
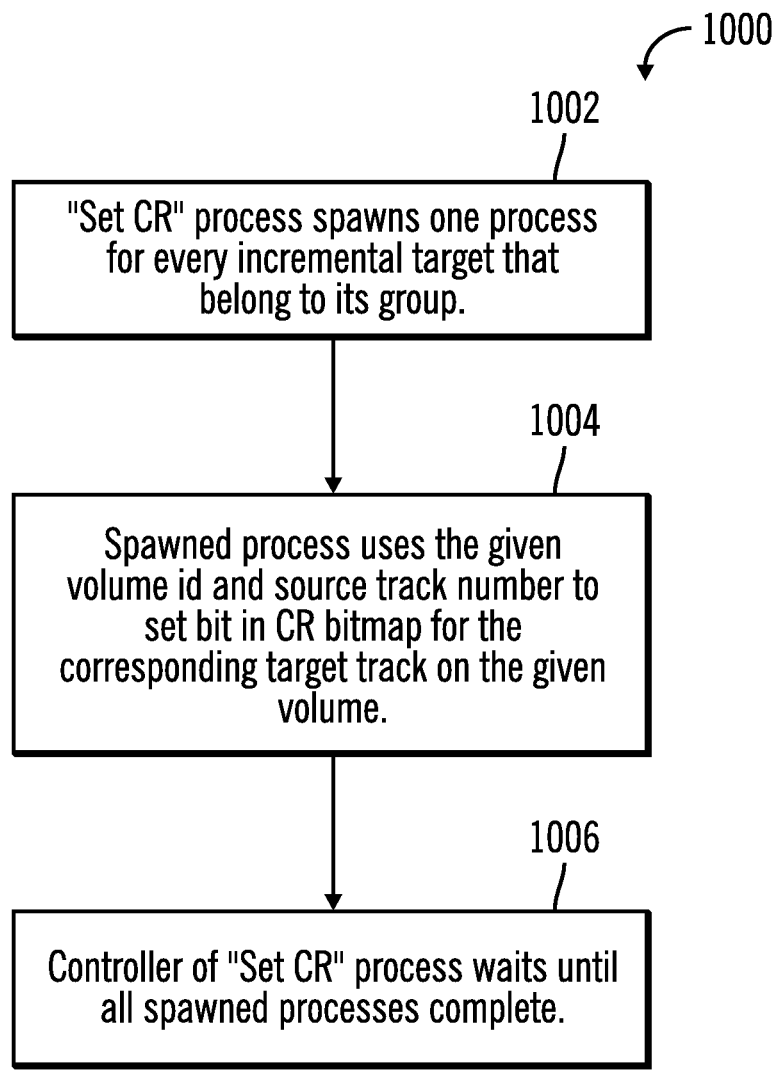
FIG. 10 illustrates a flowchart that shows fourth operations, in accordance with certain embodiments.

FIG. 10 illustrates a flowchart that shows fourth operations 1000, in accordance with certain embodiments. The operations shown in FIG. 10 may be performed by one or more components of the storage manager application 110 that executes in the storage controller Control starts at block 1002 in which the "Set CR" process spawns one process for every incremental target that belong to its group. The spawned process uses the given volume identifier and source track number to set bit in CR bitmap for the corresponding target track on the given volume (at block 1004). The controller of "Set CR process" will wait for all spawned processes complete before returning back to "setting CR bit on targets" process (at block 1006).

Figure 11:
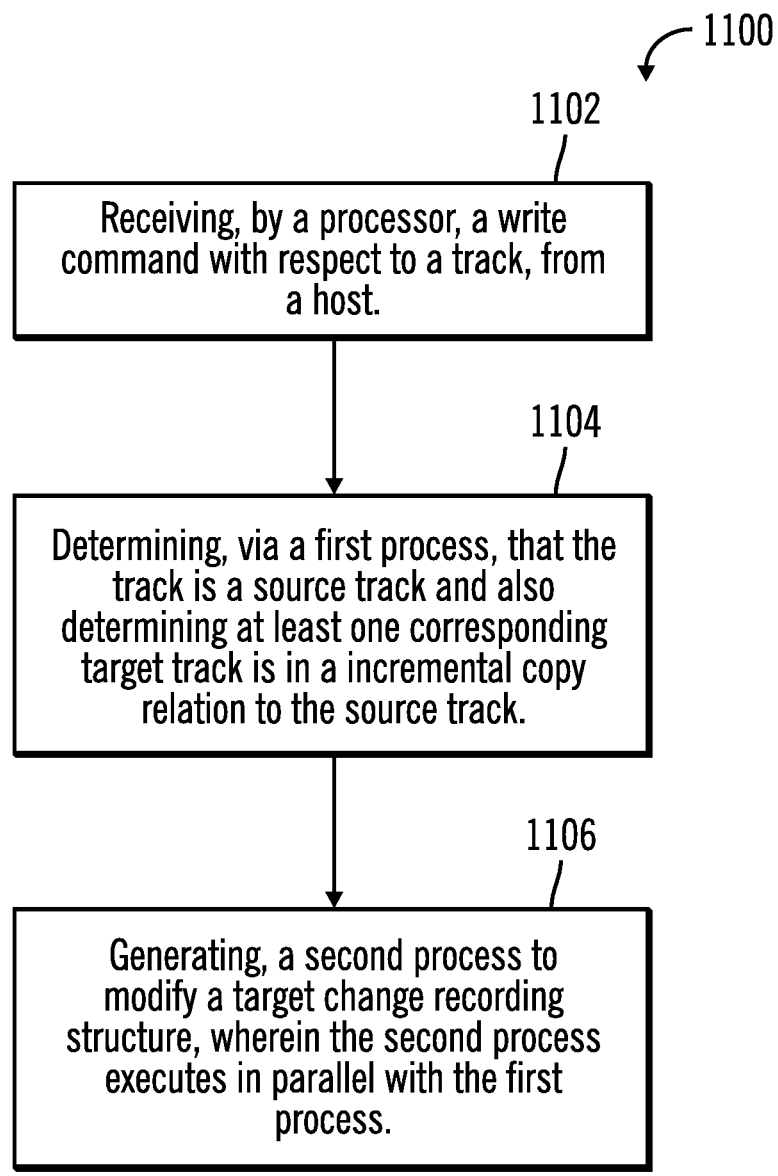
FIG. 11 illustrates a flowchart that shows fifth operations, in accordance with certain embodiments.

FIG. 11 illustrates a flowchart that shows fifth operations 1100, in accordance with certain embodiments. The operations shown in FIG. 11 may be performed by one or more components of the storage manager application 110 that executes in the storage controller 102.

Control starts at block 1102, in which a processor (e.g. a processor in the storage controller 102) receives a write command with respect to a track, from a host 104a . . . 104n. A first process (e.g., the track access intercept process 112) determines (at block 1104) that the track is a source track and also determines that at least one corresponding target track is in an incremental copy relation to the source track. A second process (e.g., one or more of the processes 116a . . . 116r) is generated (at block 1104) to modify a target change recording structure, wherein the second process executes in parallel with the first process.

Therefore, certain embodiments set change recording target bitmaps at source track "Write Track Access Intercept" in parallel to the work that already has to be done to prepare for the "write" operation, in contrast to other mechanisms in which such setting of change recording target bitmaps are performed at source track "destage" time without any parallelism.

Another disadvantage in certain other mechanisms is that increments can not be marked as completed until the scan to destage all tracks in cache for current increment completes on source volume. It leads to the complication that the next copy increment, may not start until destage scan for previous copy increment completes. This delay may increase with heavy I/O (writes) to the source volume. Certain embodiments that have been provided do not have any dependencies from destage scans on the source volume.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 12:
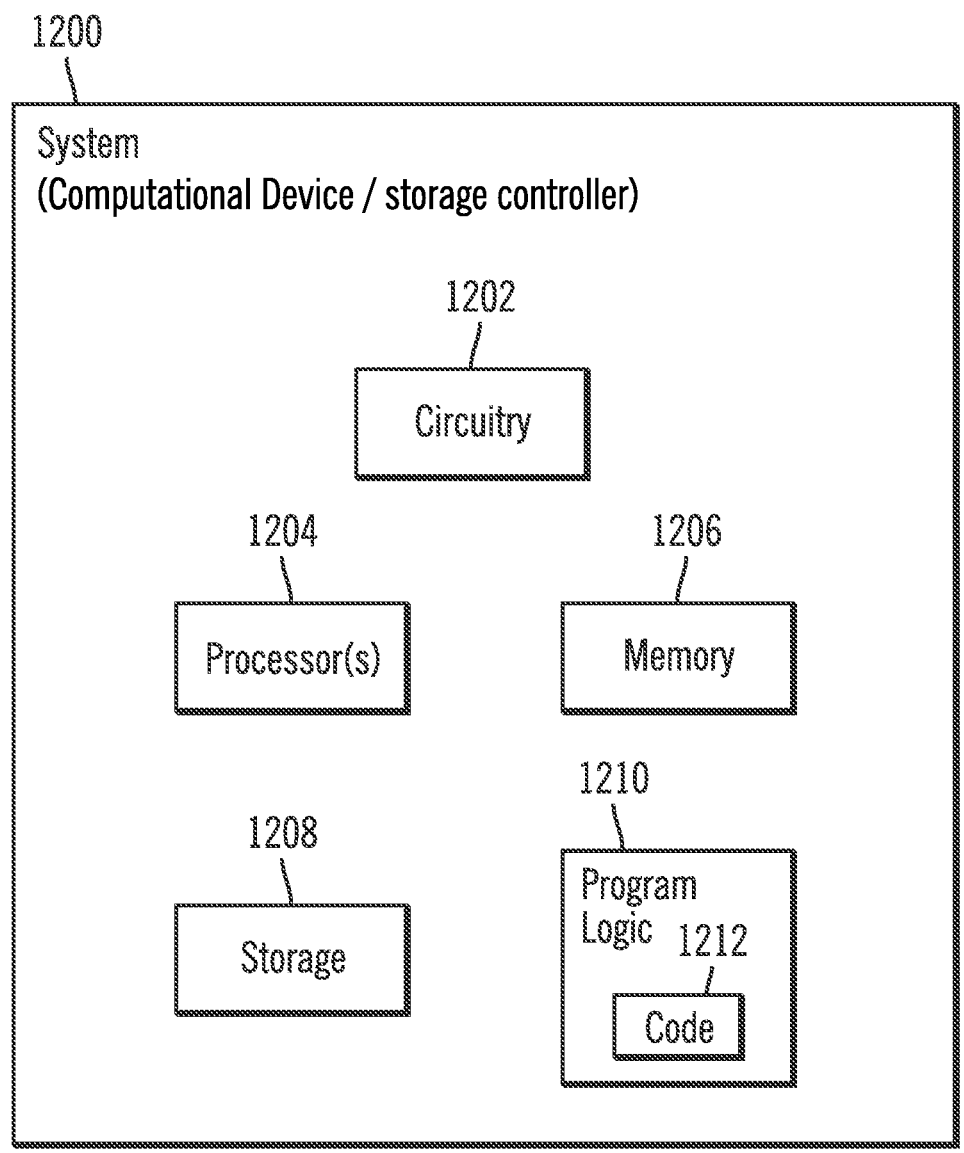
FIG. 12 illustrates a block diagram of a computational system that shows certain elements that may be included in the storage controller or any of the hosts of FIG. 1, in accordance with certain embodiments.

FIG. 12 illustrates a block diagram that shows certain elements that may be included in the storage controller 102 or the hosts 104a . . . 104n in accordance with certain embodiments. The system 1200 may comprise the storage controller 102 and may include a circuitry 1202 that may in certain embodiments include at least a processor 1204. The system 1200 may also include a memory 1206 (e.g., a volatile memory device), and storage 1208. The storage 1208 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1208 may comprise an internal storage device, an attached storage device and/or a network accessible storage device. The system 1200 may include a program logic 1210 including code 1212 that may be loaded into the memory 1206 and executed by the processor 1204 or circuitry 1202. In certain embodiments, the program logic 1210 including code 1212 may be stored in the storage 1208. In certain other embodiments, the program logic 1210 may be implemented in the circuitry 1202. Therefore, while FIG. 12 shows the program logic 1210 separately from the other elements, the program logic 1210 may be implemented in the memory 1206 and/or the circuitry 1202.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
receiving, by a processor, a write command with respect to a track, from a host, wherein in a first type of incremental copy relations, change recording structures are maintained on a source volume and on a single target volume, and wherein in a second type of incremental copy relations, no change recording structures are maintained on the source volume and the change recording structures are maintained on one or more target volumes;
determining, whether the write command is for writing to the source volume;
in response to determining that the source volume does not have only the second type of incremental copy relations, determining whether the source volume has both the first type and the second type of incremental copy relations; and
in response to determining that the source volume does not have both the first type and the second type of incremental copy relations, performing: initiating a pre-write intercept and writing to the source volume, in response to determining that the source volume has only the first type of incremental copy relations.

2. The method of claim 1, wherein:
a first process is a track access intercept process; and
a second process is a set change recording bit process.

3. The method of claim 2, wherein one source volume is in an incremental copy relation with a plurality of target volumes, the method further comprising:
generating a plurality of second processes to modify target change recording structures corresponding to the plurality of target volumes, wherein the plurality of second processes execute in parallel with the first process.

4. The method of claim 2, wherein the second process initiates additional processes for a local group and a cross-cluster group, and wherein the additional processes return control to the second process subsequent to initiation and completion of change recording processes.

5. The method of claim 1, wherein an incremental copy relation is established to perform incremental copy operations comprising incremental point-in-time copy operations, and wherein in the incremental copy operations after a first incremental copy is established, subsequent increments copy modified tracks from a source volume to a target volume since a last increment between the source volume and the target volume.

6. A system, comprising:
a memory; and
a processor coupled to the memory, wherein the processor performs operations, the operations comprising:
receiving a write command with respect to a track, from a host, wherein in a first type of incremental copy relations, change recording structures are maintained on a source volume and on a single target volume, and wherein in a second type of incremental copy relations, no change recording structures are maintained on the source volume and the change recording structures are maintained on one or more target volumes;
determining, whether the write command is for writing to the source volume;
in response to determining that the source volume does not have only the second type of incremental copy relations, determining whether the source volume has both the first type and the second type of incremental copy relations; and
in response to determining that the source volume does not have both the first type and the second type of incremental copy relations, performing: initiating a pre-write intercept and writing to the source volume, in response to determining that the source volume has only the first type of incremental copy relations.

7. The system of claim 6, wherein:
a first process is a track access intercept process; and
a second process is a set change recording bit process.

8. The system of claim 7, wherein one source volume is in an incremental copy relation with a plurality of target volumes, the operations further comprising:
generating a plurality of second processes to modify target change recording structures corresponding to the plurality of target volumes, wherein the plurality of second processes execute in parallel with the first process.

9. The system of claim 7, wherein the second process initiates additional processes for a local group and a cross-cluster group, and wherein the additional processes return control to the second process subsequent to initiation and completion of change recording processes.

10. The system of claim 6, wherein an incremental copy relation is established to perform incremental copy operations comprising incremental point-in-time copy operations, and wherein in the incremental copy operations after a first incremental copy is established, subsequent increments copy modified tracks from a source volume to a target volume since a last increment between the source volume and the target volume.

11. A computer program product, the computer program product comprising:
a non-transitory computer readable storage medium having computer readable program code embodied therewith, the computer readable program code configured to perform operations on a processor, the operations comprising:
receiving, by a processor, a write command with respect to a track, from a host, wherein in a first type of incremental copy relations, change recording structures are maintained on a source volume and on a single target volume, and wherein in a second type of incremental copy relations, no change recording structures are maintained on the source volume and the change recording structures are maintained on one or more target volumes;

determining, whether the write command is for writing to the source volume;

in response to determining that the source volume does not have only the second type of incremental copy relations, determining whether the source volume has both the first type and the second type of incremental copy relations;

and in response to determining that the source volume does not have both the first type and the second type of incremental copy relations, performing: initiating a pre-write intercept and writing to the source volume, in response to determining that the source volume has only the first type of incremental copy relations.

12. The computer program product of claim 11, wherein:
a first process is a track access intercept process; and
a second process is a set change recording bit process.

13. The computer program product of claim 12, wherein one source volume is in an incremental copy relation with a plurality of target volumes, the operations further comprising:

generating a plurality of second processes to modify target change recording structures corresponding to the plurality of target volumes, wherein the plurality of second processes execute in parallel with the first process.

14. The computer program product of claim 12, wherein the second process initiates additional processes for a local group and a cross-cluster group, and wherein the additional processes return control to the second process subsequent to initiation and completion of change recording processes.

15. The computer program product of claim 11, wherein an incremental copy relation is established to perform incremental copy operations comprising incremental point-in-time copy operations, and wherein in the incremental copy operations after a first incremental copy is established, subsequent increments copy modified tracks from a source volume to a target volume since a last increment between the source volume and the target volume.

* * * * *